United States Patent [19]

O'Neill

[11] Patent Number: 5,747,771

[45] Date of Patent: May 5, 1998

[54] METHOD AND APPARATUS FOR FORMING BLIND SLOTS INCLUDING LASER MELTING AND GAS VORTEX

[75] Inventor: William O'Neill, Liverpool, England

[73] Assignee: The BOC Group PLC, Windlesham, England

[21] Appl. No.: 631,868

[22] Filed: Apr. 12, 1996

[30] Foreign Application Priority Data

Apr. 13, 1995 [GB] United Kingdom ............... 9507719

[51] Int. Cl.$^6$ ................................................ B23K 26/14
[52] U.S. Cl. ........................ 219/121.84; 219/121.85; 219/121.68; 219/121.69; 148/202; 266/51
[58] Field of Search .................. 219/121.65, 121.66, 219/121.67, 121.68, 121.69, 121.7, 121.71, 121.72, 121.84, 121.85, 121.19, 121.2, 121.4, 121.41; 148/194, 197, 202, 205; 266/48, 51, 58, 74

[56] References Cited

U.S. PATENT DOCUMENTS

| | | | |
|---|---|---|---|
| 3,556,600 | 1/1971 | Shoupp et al. | 219/121.2 X |
| 3,597,578 | 8/1971 | Sullivan et al. | 219/121.67 |
| 3,866,398 | 2/1975 | Vernon, Jr. et al. | 219/121.69 X |
| 3,966,504 | 6/1976 | Sipek et al. | 148/202 |
| 4,303,824 | 12/1981 | Morgan et al. | 219/121.84 |
| 4,467,171 | 8/1984 | Ramos | 219/121.67 |
| 5,220,149 | 6/1993 | Neidhardt . | |

FOREIGN PATENT DOCUMENTS

| | | | |
|---|---|---|---|
| 0 600 249 A1 | 11/1993 | European Pat. Off. . | |
| 3801068 | 7/1989 | Germany | 219/121.84 |
| 39 25 646 A1 | 2/1991 | Germany . | |
| 63-157778 | 6/1988 | Japan | 219/121.72 |
| 2233114 | 1/1991 | United Kingdom | 219/121.75 |
| WO 94/21419 | 9/1994 | WIPO . | |

OTHER PUBLICATIONS

WPI abstract, EP 0 600249 A1; Nov. 1993, J. Herrmann (assignee: Linde AG).
Patent Abstracts of Japan, vol. 007, No. 055 (M–198), 5 Mar. 1983 & JP–A–57 202969 (Ibigawa Denki Kogyo KK), 13 Dec. 1982, *abstract*.

*Primary Examiner*—Teresa J. Walberg
*Assistant Examiner*—Gregory L. Mills
*Attorney, Agent, or Firm*—David A. Draegert; Salvatore P. Pace

[57] ABSTRACT

A method of machining a blind slot 3 in a workpiece 2 comprises heating the surface of the workpiece 2 above its melting temperature with, for example, a beam of laser energy and directing at least two gas streams 5, 6 such that they together with the base of the slot 3, create a vortex having a predetermined rotational direction for removing molten material from the slot 3.

10 Claims, 4 Drawing Sheets

5,747,771

METHOD AND APPARATUS FOR FORMING BLIND SLOTS INCLUDING LASER MELTING AND GAS VORTEX

The present invention relates to apparatus for and methods of removing material from a workpiece and in particular to apparatus for and methods of machining a blind slot in a workpiece.

The expression "blind slot" used throughout this specification is intended to embrace a groove, slit, slot or hole which does not extend completely but only partially through a workpiece.

BACKGROUND OF THE INVENTION

It is known to machine a groove in a metal workpiece by vertically impinging a laser beam on the surface of the workpiece to melt a volume of the metal which is subsequently removed by an off-axis jet of nitrogen gas. A narrow groove is formed by moving the workpiece relative to the stationary nitrogen gas nozzle and laser beam.

This process tends to suffer from low efficiencies because the speed of the gas jet and therefore the lift of the molten material from the groove is reduced due to pressure build-up at the base of the groove. This results in the production of relatively shallow grooves.

It is also known in a laser caving process to utilise a laser and a gas jet which both impinge on the surface of the material at an angle of 40°–45°.

In International Patent Publication Number WO94/21419, there is disclosed a method of machining a through slot in a workpiece which comprises heating the surface of the workpiece with a laser beam and directing towards said surface two gas streams.

The production of melt volumes utilising a high power laser is a relatively easy task providing that the material of the workpiece absorbs the radiation efficiently. The problem with laser machining is not melt production but the removal of the melt with sufficient speed and efficiency. This is particularly relevant when machining very narrow, deep blind slots in a workpiece.

SUMMARY OF THE INVENTION

It is an aim of the present invention to provide an apparatus for and a method of machining a workpiece using a heat source, for example, a laser beam in which the molten metal is removed, particularly from deep blind grooves or slots more effectively than in known processes.

According to one aspect of the present invention a method of machining a blind slot in a workpiece comprises the steps of heating the surface of the workpiece above its melting temperature and directing at least two gas streams such that together with the base of the slot they create a vortex with a predetermined rotational direction for removing the molten material from the slot.

Preferably, the surface of the workpiece is heated with a beam of laser energy and the first gas stream is applied as a jet to the workpiece at substantially right-angles to the surface, whilst the second stream is applied as a jet to the workpiece at an acute angle to the surface.

Alternatively, the first gas stream is created by a relative vacuum applied to the surface of the workpiece immediately adjacent the beam of laser energy and the second stream is applied as a jet to the workpiece at an acute angle to the surface.

According to a further aspect of the present invention, an apparatus for machining a blind slot in a workpiece comprises a source of heat for melting the surface of the workpiece and means for producing at least two gas streams which interact with the base of the slot in such a manner that they create a vortex with a predetermined rotational direction for removing the molten material from the slot.

BRIEF DESCRIPTION OF THE DRAWINGS

An embodiment of the invention will now be described by way of example, reference being made to the Figures of the accompanying diagrammatic drawings in which.

DESCRIPTION OF THE PREFERRED EMBODIMENTS

Figure 1:
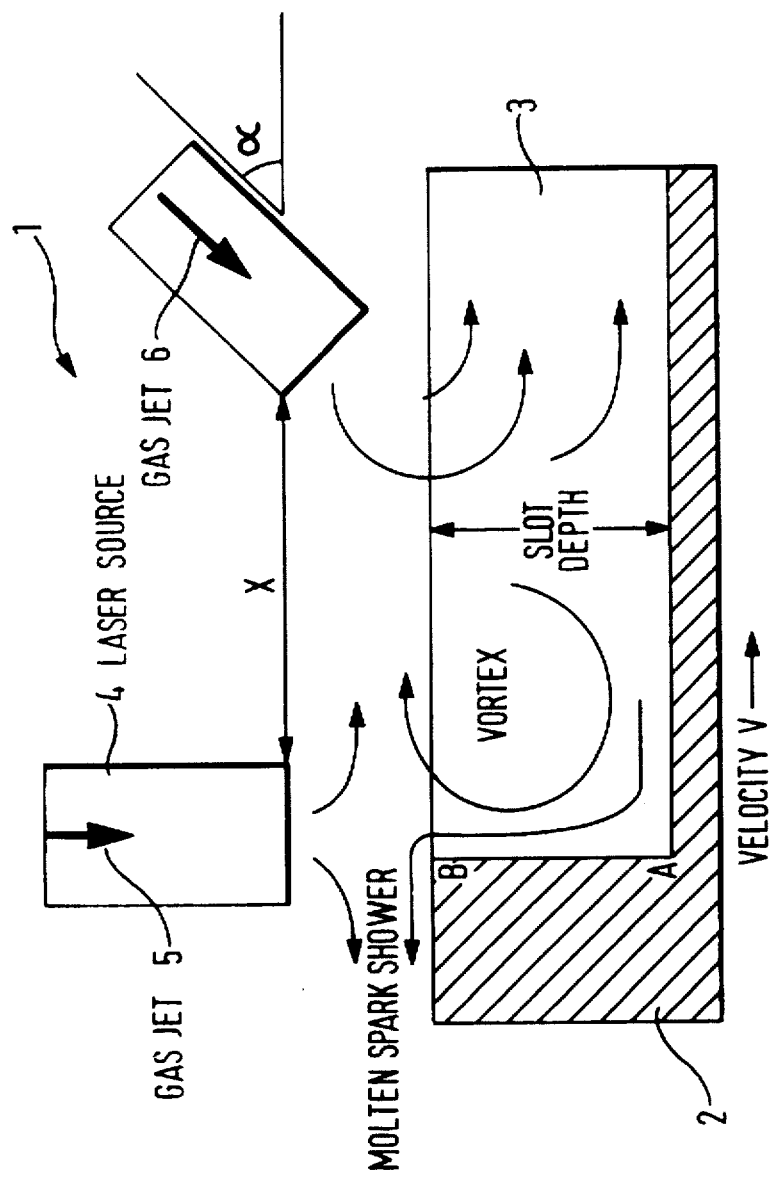
FIG. 1 is a schematic diagram of an apparatus for machining a blind slot in a workpiece.
Figure 2:
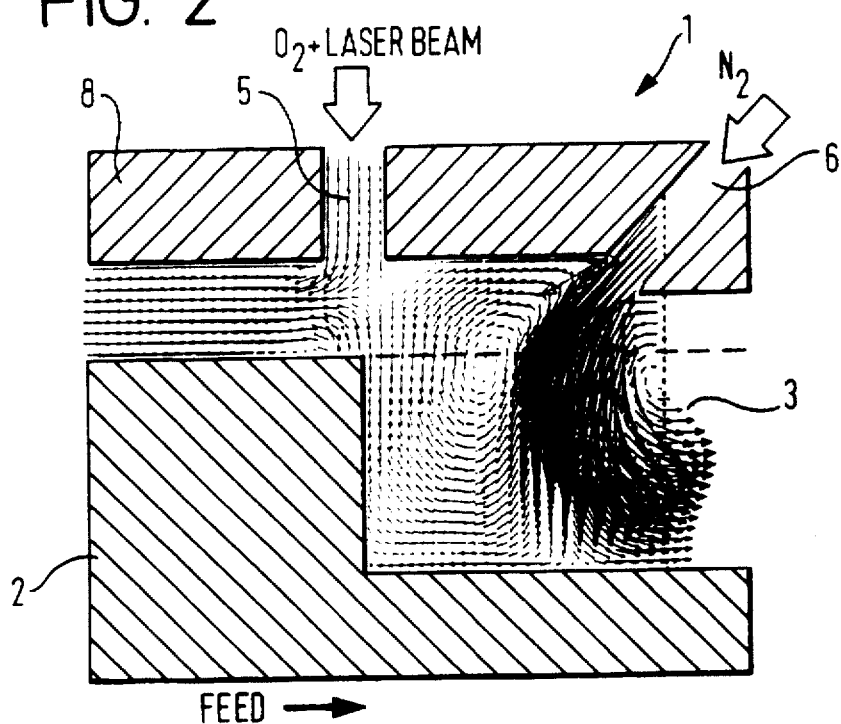
FIG. 2 is a schematic diagram similar to FIG. 1 but illustrating the velocity vectors of two gas jets.

As shown in FIGS. 1 and 2, an apparatus 1 for machining a deep blind spot 3 in a workpiece 2 includes a source 4 of laser energy eg. a $CO_2$ laser which is capable of directing a beam of laser energy at substantially right-angles to the upper (as shown) surface of the workpiece 2. A nozzle assembly 8 is provided for directing a first jet 5 of gas, for example oxygen, on to the upper surface of a workpiece 2 substantially co-axially with the beam of laser energy. Spaced from said jet 5 is a second jet 6 of gas, for example nitrogen, which is also directly towards the upper surface of the workpiece 2 at an acute angle alpha ($\alpha$) to said surface in the general direction of the first gas jet. The distance 'x' between the jets 5, 6 can be between 2 and 6 mm.

In use, the workpiece 2 is caused to move to the right as shown, relative to the $CO_2$ laser beam which is focused on to the surface of the workpiece with sufficient power to melt a small volume of the workpiece 2 thereby creating a slot 3. Substantially simultaneously the first and second gas jets 5, 6 create together with the base of the slot 3 a vortex with a definite rotational direction which removes the molten material and other debris from the slot 3.

Figure 3:
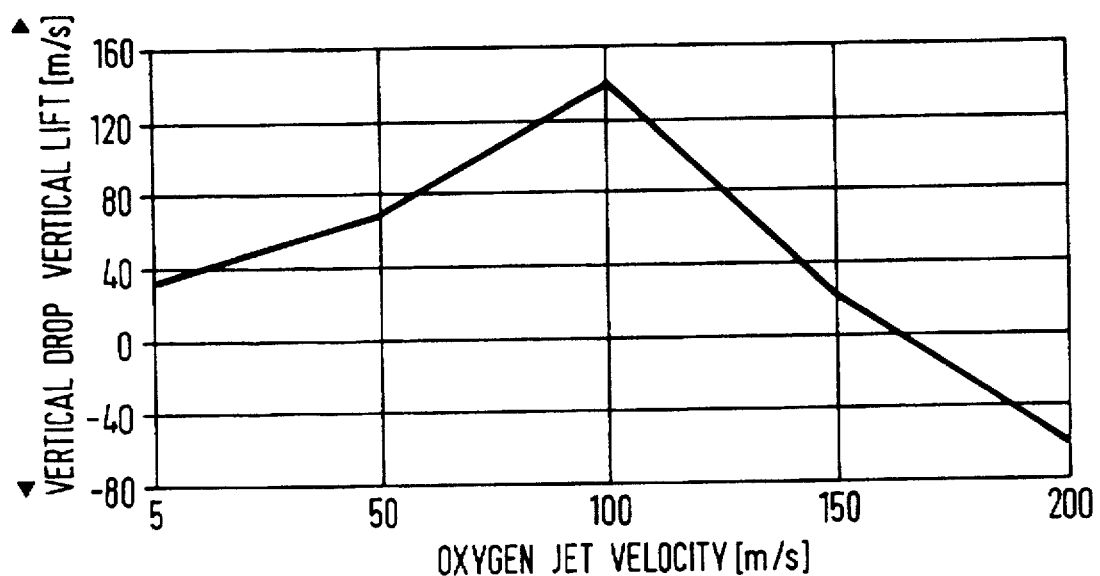
FIG. 3 is a graph illustrating the gas velocity from the bottom of a slot being machined in the workpiece of FIG. 1, as a function of the velocity of a gas jet.

The vortex rotational velocity is controlled by varying the velocity of the first jet of gas which is effectively a stabilising jet. Referring to FIG. 3, this illustrates the uplifting gas velocity from the bottom of the slot 3 to the surface of the workpiece at a location close to the slot front marked A-B in FIG. 1, as a function of the velocity of the first stabilising jet 5. If the velocity is very low, for example 5 meters per second, the action of the second jet 6 serves to blow the molten material and debris out of the slot 3.

As a generality by increasing the stabilising jet velocity, the uplifting gas velocity increases. For example, increasing the stabilising jet velocity to 100 meters per second the uplifting gas velocity increases to a maximum of 130 meters per second. However, further increases in the stabilising jet velocity to 150 to 200 meters per second serves to reverse the effect and the uplifting gas velocity reduces as the vortex is on the verge of reversing its direction.

It is believed that the vortex lifts and effectively sucks any molten metal out of the depth of the slot 3. By varying the speed of the workpiece beneath the laser beam and the stabilising gas jet 5, the depth of the slot 3 can be controlled. Further, the distance between the sources of the gas jets 5, 6 indicated by X in FIG. 1, is influential in controlling the depth of the slot 3. The greater the value of X the greater the depth.

By using oxygen as the first gas jet i.e. the stabilising jet, the exothermic energy liberated in the slot allows for substantially deeper slots than with other gases.

Slots have been produced with a variation in the pressure and therefore velocity of the first stabilising jet. In the above described embodiment, the stabilising jet was composed of pure oxygen with the second side jet of nitrogen set at a fixed pressure of 11 bar.

Figure 4:
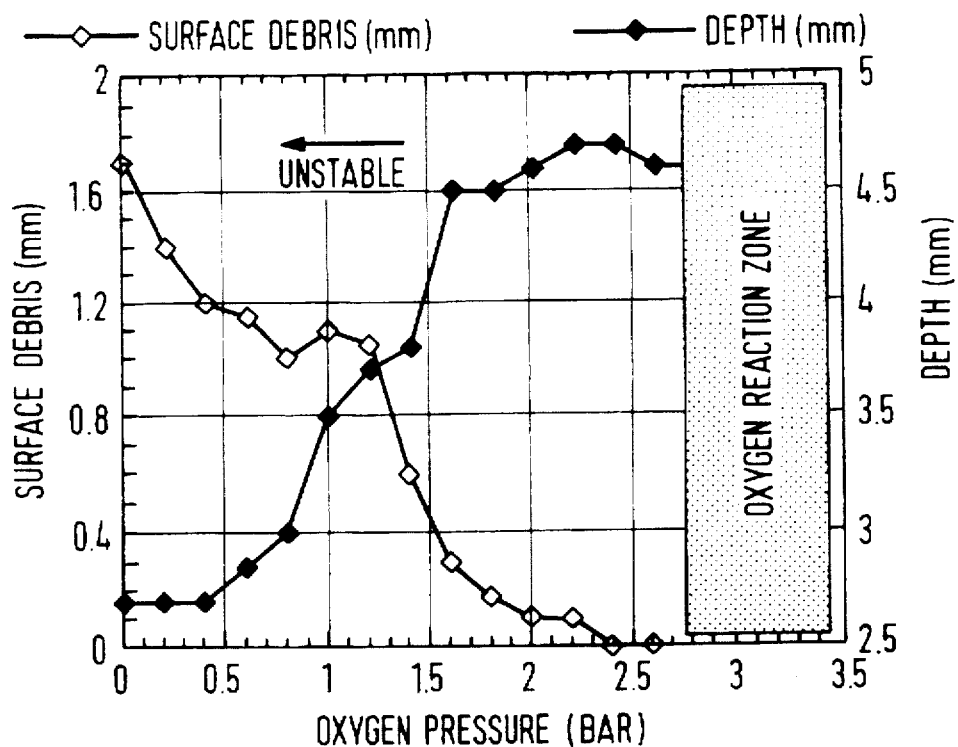
FIG. 4 is a graph of slot depth and surface debris against gas pressure.

FIG. 4 gives a plot of slot depth and surface debris against oxygen pressure. Too low an oxygen pressure produces ineffective removal and the slot depth decreases with surface debris increasing. Below a pressure of 1.5 bar the process was unstable. The optimum pressure for a particular nozzle configuration was found to be 2.5 bar. Too high a pressure produces reversal of the uplift and the slot closes producing a catastrophic oxygen reaction.

Figure 5:
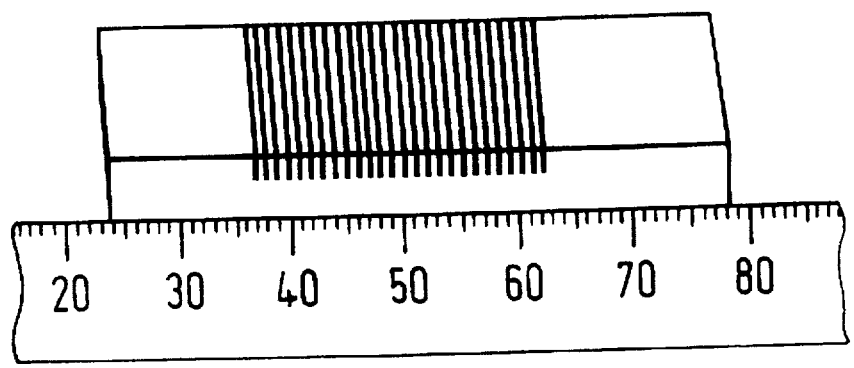
FIG. 5 is a perspective view of a workpiece machined with a plurality of blind slots according to the method of the present invention.
Figure 6:
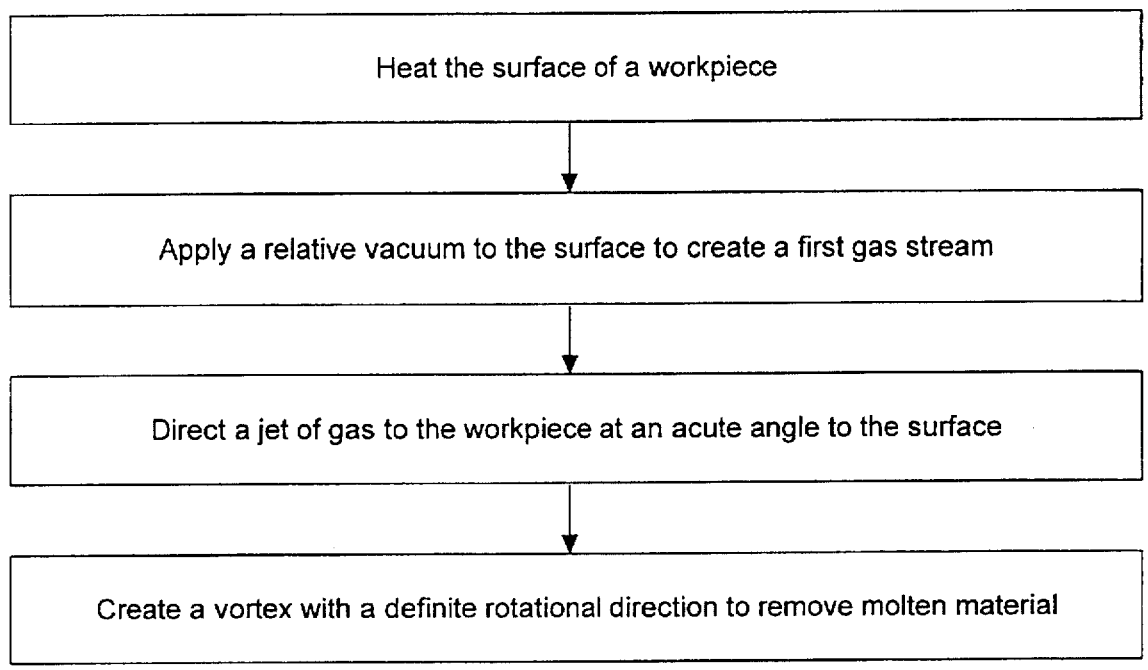
FIG. 6 is a flow chart of the method steps of a preferred embodiment.

FIG. 5 illustrates a workpiece formed with a plurality of blind slots for example, cooling channels. The workpiece is a 20 mm thick steel block and the slots where machined at a rate of 1.5 m/min using a 1KW $CO_2$ laser. The slots are 300 μm wide and 3 mm deep with a spacing of 1 mm between each slot. The nitrogen jet was applied at a pressure of 11 bar and the oxygen jet at a pressure of 2.4 bar. Although reference has been made in the above described embodiment to a first jet of gas directed towards the workpiece it has been found that a vortex can be created equally well by reversing the direction of the first jet by creating a vacuum. Furthermore, although in the above described embodiment only two gas streams have been described, it will be clear that more than two gas streams can be utilised to create the vortex.

I claim:

1. A method of machining a blind slot in a surface of a workpiece comprising the steps of heating the surface of the workpiece above its melting temperature and directing at least two gas streams such that they together with a base of the slot create a vortex with a definite rotational direction for removing molten material from the slot.

2. A method as claimed in claim 1, in which a first gas stream is applied as a jet to the workpiece at substantially right-angles to the surface, whilst a second stream is applied as a jet to the workpiece at an acute angle to the surface toward the first stream.

3. A method as claimed in claim 2, in which the first gas stream is a jet of oxygen and the second stream jet is a jet of nitrogen.

4. A method as claimed in claim 1, in which a first gas stream is created by a relative vacuum applied to the heated surface and a second stream is applied as a jet to the workpiece at an acute angle to the surface toward the first stream.

5. A method as claimed in claim 1, in which the surface of the workpiece is heated by a beam of laser energy.

6. A method as claimed in claim 5, in which a first gas stream is applied as a jet to the workpiece at substantially right-angles to the surface, whilst a second stream is applied as a jet to the workpiece at an acute angle to the surface toward the first stream.

7. A method as claimed in claim 6, in which the first gas stream is a jet of oxygen and the second stream jet is a jet of nitrogen.

8. A method as claimed in claim 5, in which a first gas stream is created by a relative vacuum applied to the surface of a workpiece immediately adjacent the beam of laser energy and a second stream is applied as a jet to the workpiece at an acute angle to the surface toward the first stream.

9. An apparatus for machining a blind slot in a workpiece comprising, a heat source for melting the surface of the workpiece and forming molten material, and means for directing at least two gas streams which interact in such a manner that they together with the base of a slot create a vortex with a definite rotational direction for removing the molten material from the slot.

10. An apparatus as claimed in claim 9, in which the heat source is a beam of laser energy.

* * * * *